United States Patent
Langman et al.

(10) Patent No.: US 9,471,948 B2
(45) Date of Patent: Oct. 18, 2016

(54) SYSTEM AND METHOD FOR ADMINISTERING LICENSES STORED BY A PRODUCT UNIT, AND ADMINISTRATION OF SAID UNIT IN THE FIELD

(71) Applicant: Seed Labs Sp. z o.o., Cracow (PL)

(72) Inventors: Maciej Langman, Cracow (PL); Szymon Slupik, Cracow (PL); Adam Gembala, Cracow (PL)

(73) Assignee: Seed Labs Sp. z o.o. (PL)

( * ) Notice: Subject to any disclaimer, the term of this patent is extended or adjusted under 35 U.S.C. 154(b) by 0 days.

(21) Appl. No.: 14/563,591

(22) Filed: Dec. 8, 2014

(65) Prior Publication Data
US 2015/0304112 A1    Oct. 22, 2015

Related U.S. Application Data

(60) Provisional application No. 61/981,068, filed on Apr. 17, 2014.

(51) Int. Cl.
*H04L 9/00* (2006.01)
*G06Q 50/18* (2012.01)
(Continued)

(52) U.S. Cl.
CPC ............ *G06Q 50/184* (2013.01); *G06F 8/61* (2013.01); *G06F 21/10* (2013.01);
(Continued)

(58) Field of Classification Search
CPC ............ H04L 9/3281; H04L 9/3294; H04L 63/0823; H04L 63/0869; H04L 63/10; H04L 63/08; H04L 63/0807; H04L 63/0876; H04W 12/06; H04W 12/08; H04W 28/0215

USPC ........ 380/270; 713/150, 156, 168, 173, 176, 713/179, 189, 169, 170; 726/2, 10
See application file for complete search history.

(56) References Cited

U.S. PATENT DOCUMENTS 6,826,690 B1 * 11/2004 Hind ................... G06F 21/31
                                                              713/173
6,938,154 B1    8/2005 Berson et al.
(Continued)

FOREIGN PATENT DOCUMENTS

WO    2012040393 A2    3/2012

OTHER PUBLICATIONS

"International Search Report and Written Opinion", issued in related International Application No. PCT/US2015/025143 on Jul. 27, 2015.
(Continued)

*Primary Examiner* — Hosuk Song
(74) *Attorney, Agent, or Firm* — Kaplan Breyer Schwarz & Ottesen, LLP

(57) ABSTRACT

The product unit disclosed herein has identification data that are stored internally in memory. This stored identification data can be viewed as the product unit's "digital nameplate," in that the data can represent the product unit's identifier, brand, and so on. Each data set is digitally signed while on the production line by using an encryption technique. The digitally signed data set is then written into the product unit's memory where it can be used for verification. A first digitally-signed data set can be used to control the use of one or more software modules that are provided by a software owner. The data that are undergoing signature contain at least one globally-unique identifier, which can be used to identify cloning attempts. Additionally, more than one digital signature can be used, in order to protect and control the use of features other than the software, such as the product brand.

19 Claims, 10 Drawing Sheets

(51) Int. Cl.
G06F 9/445 (2006.01)
G06Q 30/00 (2012.01)
H04L 9/30 (2006.01)
H04L 9/32 (2006.01)
H04L 29/08 (2006.01)
H04W 12/06 (2009.01)
G06F 21/10 (2013.01)
H04L 29/06 (2006.01)

(52) U.S. Cl.
CPC ........... *G06Q 30/0185* (2013.01); *H04L 9/30* (2013.01); *H04L 9/3247* (2013.01); *H04L 63/0876* (2013.01); *H04L 63/126* (2013.01); *H04L 67/10* (2013.01); *H04W 12/06* (2013.01); *H04L 2463/103* (2013.01)

(56) References Cited

U.S. PATENT DOCUMENTS

| | | | | |
|---|---|---|---|---|
| 7,584,351 B2* | 9/2009 | Kakii | ............ | H04L 9/3268 709/225 |
| 8,291,231 B2* | 10/2012 | Ueno | ............ | H04L 9/0844 380/277 |
| 8,327,146 B2* | 12/2012 | Madhavan | ............ | H04L 9/3263 380/278 |
| 8,392,716 B2* | 3/2013 | Oishi | ............ | H04L 63/062 380/255 |
| 2002/0073325 A1 | 6/2002 | Ho et al. | | |
| 2004/0171374 A1* | 9/2004 | Little | ............ | H04L 29/06 455/418 |
| 2005/0255830 A1 | 11/2005 | Thorson et al. | | |
| 2006/0206945 A1 | 9/2006 | Kato et al. | | |
| 2007/0174472 A1 | 7/2007 | Kulakowski | | |

OTHER PUBLICATIONS

"International Search Report and Written Opinion", dated Nov. 20, 2015, issued in related International Application No. PCT/US2015/025145.

Public Key Certificate, Jul. 15, 2015, Publisher: Wikipedia; URL:https://en.wikipedia.org/w/index.php?title=Public_key_certficate&oldid=604181513 [retrieved Jul. 15, 2015]; XP055202618.

* cited by examiner

500

900

1000

SYSTEM AND METHOD FOR ADMINISTERING LICENSES STORED BY A PRODUCT UNIT, AND ADMINISTRATION OF SAID UNIT IN THE FIELD

CROSS REFERENCE TO RELATED APPLICATIONS

The following case is incorporated herein by reference: U.S. Patent Application Ser. No. 61/981,068, filed Apr. 17, 2014. If there are any contradictions or inconsistencies in language between this application and the case that has been incorporated by reference that might affect the interpretation of the claims in this application, the claims in this application should be interpreted to be consistent with the language in this application.

FIELD OF THE INVENTION

The present invention relates to telecommunications in general, and, more particularly, to administering one or more licenses associated with a product unit that comprises an electronic module with storage capability, and also to monitoring and controlling the product unit in the field.

BACKGROUND OF THE INVENTION

A license is an agreement that permits the use of something. In the area of intellectual property, such permission might include, for example, the copying of software, the use of a patented invention, or the distribution of products under a trademark or particular name.

Without a license, any use or exploitation of an owner's intellectual property by another would amount to illegal copying or infringement. Such copying would be improper and could be stopped through legal intervention if the intellectual property owner wanted to take such action.

Unscrupulous individuals and businesses, such as counterfeiters, often attempt to use one's intellectual property without permission. Such exploitation on the part of these individuals and businesses is often difficult to detect and to trace. Moreover, the exploitation of an owner's intellectual property might occur alongside an apparent authorized use of the property, and such exploitation can also be difficult to detect.

SUMMARY OF THE INVENTION

The present invention enables the administration of one or more licenses associated with a product unit, and also the monitoring and control of the product unit in the field. The product unit disclosed herein has identification data that are stored internally. This stored identification data can be viewed as the product unit's "digital nameplate," in that the data represents, among other things, one or more of the product unit's identifier, brand, function, and so on. In order to prevent a manufacturer from creating illegal copies of the product unit or manufacturing a greater number of product units than was ordered, each data set is digitally signed while on the production line by using an encryption technique, such as while not being limited to asymmetric cryptography. The digitally signed data set is then written into the product unit's memory where it can be used for verification and for other purposes as disclosed herein. In particular, a first digitally-signed data set can be used to control the use of one or more software modules that are provided by the software owner.

In accordance with an illustrative embodiment of the present invention, a crucial part of the nameplate signing is that data that are undergoing signature contain at least one globally-unique identifier, which can be used to identify cloning attempts. In some embodiments of the present invention, a media access control (MAC) address can serve as this identifier for Bluetooth Low Energy (BLE) communications and for communications based on other protocols. As this address is used to address the product-unit devices on the data-link layer, any duplications of a MAC address- or other globally-unique identifier for that matter—in a single network can be detected and cause communications to malfunction. In some other embodiments of the present invention, a globally unique identifier that is different from a MAC address can be used (e.g., IPv6 address, etc.).

The product unit's globally unique communication address or identifier, with or without some additional information that is important from a business perspective, is used for a digital signature, which can be subsequently used to verify the authenticity of the product unit. Consequently, if one wants to counterfeit or clone the device, the counterfeiter must clone the communications address as well, in order to keep the digital signature valid. This can be detected effectively by a technique disclosed herein.

More than one digital signature can be used, in accordance with an illustrative embodiment of the present invention, in order to protect and control the use of intellectual property other than the software. As already described, a first digital signature is used by the software owner of a software module to be licensed for use in the product unit. A second digital signature can be used by the brand owner of a brand to be licensed for use in the product unit, for example and without limitation. As those who are skilled in the art will appreciate after reading this specification, a different number of independent signatures than two is possible. Furthermore, any combination of signatures can be used.

A physical world analogue to the digital nameplate herein is a hologram that is affixed to a compact disc (CD) case. In theory, the CD hologram is proof of genuineness and enables copyright owners to verify the number of disks manufactured. In reality, however, a perfect copy of the CD product, including the hologram, can be indistinguishable from the original. In contrast, if the data stored in the disclosed product unit were signed using the MAC address or other unique identifier, a perfect copy of the product unit and stored data would indeed have a valid digital signature. This is because all of the signed data would be the same as in the original. But advantageously, such a clone would have impaired functionality because two or more identical MAC addresses would be unable to work within the same computer network. Additionally, a digitally signed nameplate can also be used to protect business-critical information from being tampered with.

An illustrative method for controlling a device comprises: transmitting, by a first wireless device, a first message comprising a first identifier, wherein the first message requests a first digitally-signed document from a second wireless device, wherein the second wireless device is identified by the first identifier; receiving, by the first wireless device, a second message from the second wireless device, in response to the transmitting of the first message, wherein the second message comprises the requested first digitally-signed document, wherein first digitally-signed document comprises a first digital signature; verifying that the first digital signature received from the second wireless device is valid, based on a first public key; and presenting to a user, by the first wireless device, a first indicium that represents the second wireless device, only if the first digital signature is verified as being valid.

An illustrative first wireless device for controlling another device comprises: a transmitter configured to transmit a first message comprising a first identifier, wherein the first message requests a first digitally-signed document from a second wireless device, wherein the second wireless device is identified by the first identifier; a receiver configured to receive a second message from the second wireless device, in response to the transmitting of the first message, wherein the second message comprises the requested first digitally-signed document, wherein first digitally-signed document comprises a first digital signature; a processor configured to verify that the first digital signature received from the second wireless device is valid, based on a first public key; and a display configured to present a first indicium that represents the second wireless device, only if the first digital signature is verified as being valid.

An illustrative method for monitoring a device comprises: receiving, by a server computer, i) first message comprising a) a first identifier that identifies a first wireless device and b) a first datum, and ii) a second message comprising a) a second identifier that identifies a second wireless device and b) a second datum; comparing, by the server computer, the first datum and the second datum, based on the first identifier and the second identifier matching each other; inferring, by the server computer, a characteristic of the manufacture of the first wireless device, based on the comparing; and transmitting, by the server computer, a third message based on the inferred characteristic.

DETAILED DESCRIPTION

For the purposes of the present specification, the following terms and their inflected forms are defined as follows:

i. A "product unit" or "product" is defined as something produced by effort, or by some mechanical or industrial process.

ii. A "business entity" is defined as a commercial, corporate, and/or other institution that is formed and administered according to commercial law in order to engage in business activities, for the sale of a product (e.g., the product unit disclosed herein, etc.) or a service. For example and without limitation, a business entity can be a corporation, partnership, limited liability company, limited liability partnership, sole proprietorship, sole trader, or cooperative.

iii. A "brand" is defined as a name, term, design, symbol, or any other feature that identifies one seller's product or service as being distinct from those of other sellers.

iv. A "document" is defined as electronic matter that provides information (e.g., a license, a media access control [MAC] address, a brand identifier, etc.). A "digitally-signed document" is defined as a document to which an algorithm, such as while not being limited to public-key cryptography, has been applied in order to enable, among other things, the authentication of the document.

Other terms may also be defined elsewhere herein.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are well-known in the art are depicted in block diagram form in the accompanying figures in order to keep salient aspects of the present invention from being unnecessarily obscured.

Figure 1:
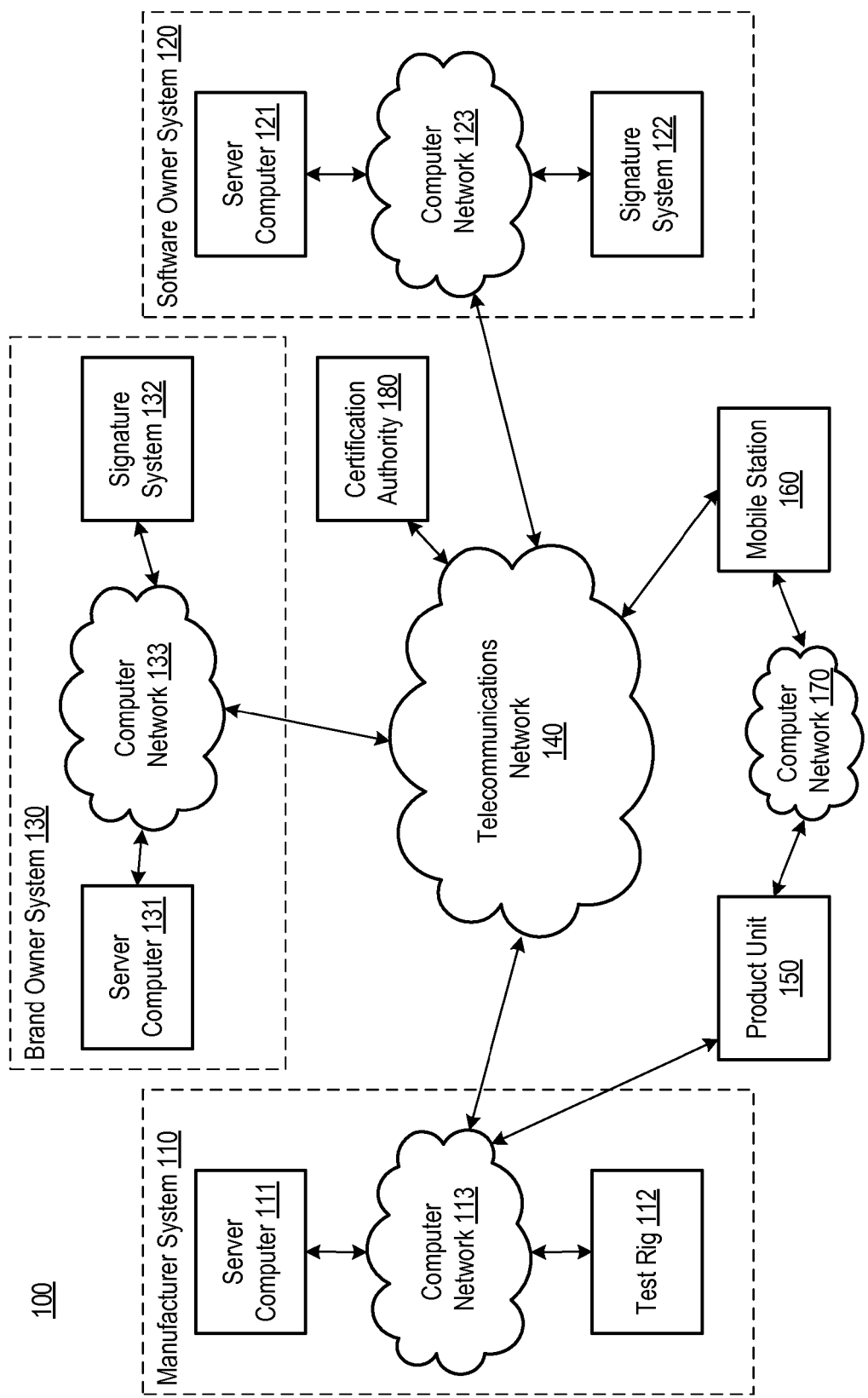
FIG. 1 depicts telecommunications system 100, in accordance with an illustrative embodiment of the present invention.

FIG. 1 depicts telecommunications system 100, in accordance with an illustrative embodiment of the present invention. System 100 comprises: manufacturer system 110, software owner system 120, brand owner 130, telecommunications network 140, product unit 150, mobile station 160, computer network 170, and certification authority 180. The aforementioned elements are interconnected as shown.

Manufacturer system 110 is a collection of software and hardware that is used to manufacture product unit 150, by interacting with software owner system 120 and brand owner system 130, in addition to product unit 150, as described in detail below. System 110 comprises one or more computers having non-transitory memory, processing components, and communication components, including server computer 111, computer network 113, and test rig 112. Server computer 111 and test rig 112 are described below and in FIGS. 2 and 3, respectively. Computer network 113 enables communication between server computer 111, test rig 112, product unit 150, and telecommunications network 140. Network 113 comprises one or more of wired Ethernet, WiFi, and Bluetooth Low Energy (BLE) networks. However, as those who are skilled in the art will appreciate after reading this specification, computer network 113 can be based on one or more different types of wired and/or wireless network technology standards, in addition to or instead of those mentioned above, such as Z-Wave, ZigBee, Bluetooth Classic, or Thread, for example and without limitation. Furthermore, as those who are skilled in the art will appreciate after reading this specification, test rig 112 and product unit 150 in some embodiments can be connected directly to each other, at least for some purposes and/or for some portion of time, such as through Universal Serial Bus (USB), FireWire™, or Thunderbolt™, for example and without limitation.

Software owner system 120 is a collection of software and hardware that is used to administer licenses that are relevant to product unit 150, including software licenses, by interacting with manufacturer system 110 and brand owner system 130, as described in detail below. System 120 comprises one or more computers having non-transitory memory, processing components, and communication components, including server computer 121, computer network 123, and digital signature system 122 (or "signature system 122"). Server computer 121 is a collection of software and hardware similar to server computer 111. Signature system 122 is a collection of software and hardware that provides a digital signature and information from a database as described below. In some embodiments, system 122 comprises a server computer similar to server computer 111. Computer network 123 enables communication between server computer 121, signature system 122, and telecommunications network 140. Network 123 comprises one or more of wired Ethernet and WiFi networks; however, as those who are skilled in the art will appreciate after reading this specification, a different combination of wired and/or wireless networks can be used within network 123 in order to enable communication.

Brand owner system 130 is a collection of software and hardware that is used to administer licenses that are relevant to product unit 150, including brand licenses, by interacting with manufacturer system 110 and software owner system 120, as described in detail below. System 130 comprises one or more computers having non-transitory memory, processing components, and communication components, including server computer 131, computer network 133, and digital signature system 132 (or "signature system 132"). Server computer 131 is a collection of software and hardware similar to server computer 111. Signature system 132 is a collection of software and hardware that provides a digital signature and information from a database as described below. In some embodiments, system 132 comprises a server computer similar to server computer 111. Computer network 133 enables communication between server computer 131, signature system 132, and telecommunications network 140. Network 133 comprises one or more of wired Ethernet and WiFi networks; however, as those who are skilled in the art will appreciate after reading this specification, a different combination of wired and/or wireless networks can be used within network 133 in order to enable communication.

In accordance with an illustrative embodiment of the present invention, systems 110, 120, and 130 are controlled by separate business entities. For example and without limitation, manufacturer system 110 is controlled by a manufacturer entity, software owner system 120 is controlled by a software owner entity, and brand owner system 130 is controlled by a brand owner entity, each having separate control with respect to one another, at least at some level. As those who are skilled in the art will appreciate after reading this specification, however, two or more of systems 110, 120, and 130 might be controlled by the same business entity, in some alternative embodiments of the present invention.

Telecommunications network 140 comprises a collection of links and nodes that enable telecommunication between devices, in well-known fashion. Telecommunications network 140 provides at least some of the elements of system 100 with connectivity to one other. In some embodiments of the present invention, telecommunications network 140 is the Internet; in some other embodiments of the present invention, network 140 is the Public Switched Telephone Network (PSTN); in still some other embodiments of the present invention, network 140 is a private data network. It will be clear to those with ordinary skill in the art, after reading this disclosure, that in some embodiments of the present invention network 140 can comprise one or more of the above-mentioned networks and/or other telecommunications networks, without limitation. Furthermore, it will be clear to those will ordinary skill in the art, after reading this disclosure, that telecommunications network 140 can comprise elements that are capable of wired and/or wireless communication, without limitation.

Product unit 150 is an apparatus that comprises memory, processing components, and communication components. In accordance with an illustrative embodiment of the present invention, unit 150 is a smart appliance. For example and without limitation, unit 150 can be a sound system, a kitchen appliance, a home appliance used outside the kitchen, an electrical plug, a thermostat, a coffeemaker, a kettle, or a dispenser. However, as those who are skilled in the art will appreciate after reading this specification, the product unit can be another type of smart appliance or even another type of apparatus entirely. Unit 150 is manufactured by manufacturer system 110, based on one or more licenses provided from software owner system 120 or brand owner system 130, or both. Product unit 150 is described in detail below and in FIG. 4.

Mobile station 160 is a wireless telecommunications terminal that is configured to transmit and/or receive communications wirelessly. It is an apparatus that comprises memory, processing components, telecommunication components, and user interface components (e.g., display, speaker, keyboard, microphone, etc.). Mobile station 160 comprises the hardware and software necessary to be compliant with the protocol standards used in the wireless network or networks (e.g., network 140, network 170, etc.) in which it operates and to perform the processes described below and in the accompanying figures. For example and without limitation, mobile station 160 is capable of:
  i. receiving an incoming (i.e., "mobile-terminated") telephone call or other communication (e.g., application-specific data, SMS text, email, media stream, etc.),
  ii. transmitting an outgoing (i.e., "mobile-originated") telephone call or other communication (e.g., application-specific data, SMS text, email, media stream, etc.),
  iii. controlling and monitoring product unit 150, and/or
  iv. receiving, transmitting, or otherwise processing one or more signals in support of one or more of capabilities i through iii.

Furthermore, mobile station 160 is illustratively a smartphone with at least packet data capability provided and supported by the network in which it operates and that is configured to execute a software application (e.g., an "app") for controlling one or more product units 150. In some alternative embodiments of the present invention, mobile station 160 can be referred to by a variety of alternative names such as, while not being limited to, a wireless transmit/receive unit (WTRU), a user equipment (UE), a wireless terminal, a cell phone, or a fixed or mobile subscriber unit. For that matter, mobile station 160 can be any other type of device that is capable of operating in a wireless network environment, mobility-oriented or otherwise, and of i) connecting to product unit 150, ii) fetching its identification data and signature, and iii) validating it either internally by using a public key that device 160 possesses or by calling a cloud service of the software owner or the manufacturer. In at least some embodiments of the present invention, these functions are executed in the background by the controlling application.

Computer network 170 enables communication between mobile station 160 and product unit 150. Network 170 comprises a Bluetooth Low Energy (BLE) network. However, as those who are skilled in the art will appreciate after reading this specification, computer network 170 can be based on one or more different types of wireless network technology standards, in addition to or instead of BLE, such as Z-Wave, ZigBee, Wi-Fi, Bluetooth Classic, or Thread, for example and without limitation, in order to enable communication between the mobile station and product unit. Furthermore, as those who are skilled in the art will appreciate after reading this specification, mobile station 160 and product unit 150 in some embodiments can be connected directly and non-wirelessly to each other, at least for some purposes and/or for some portion of time, such as through Universal Serial Bus (USB), FireWire™, or Thunderbolt™, for example and without limitation.

Certification authority 180 is a collection of software and hardware that is used to issue digital certificates as are known in the art. The digital certificate certifies the ownership of public key by the named subject of the certificate, in well-known fashion. This allows other entities such as, but not limited to, system 110, system 120, system 130, product unit 150, and mobile station 160, to rely upon signatures or assertions made by the private key that corresponds to the public key that is certified, as described in detail below.

Figure 2:
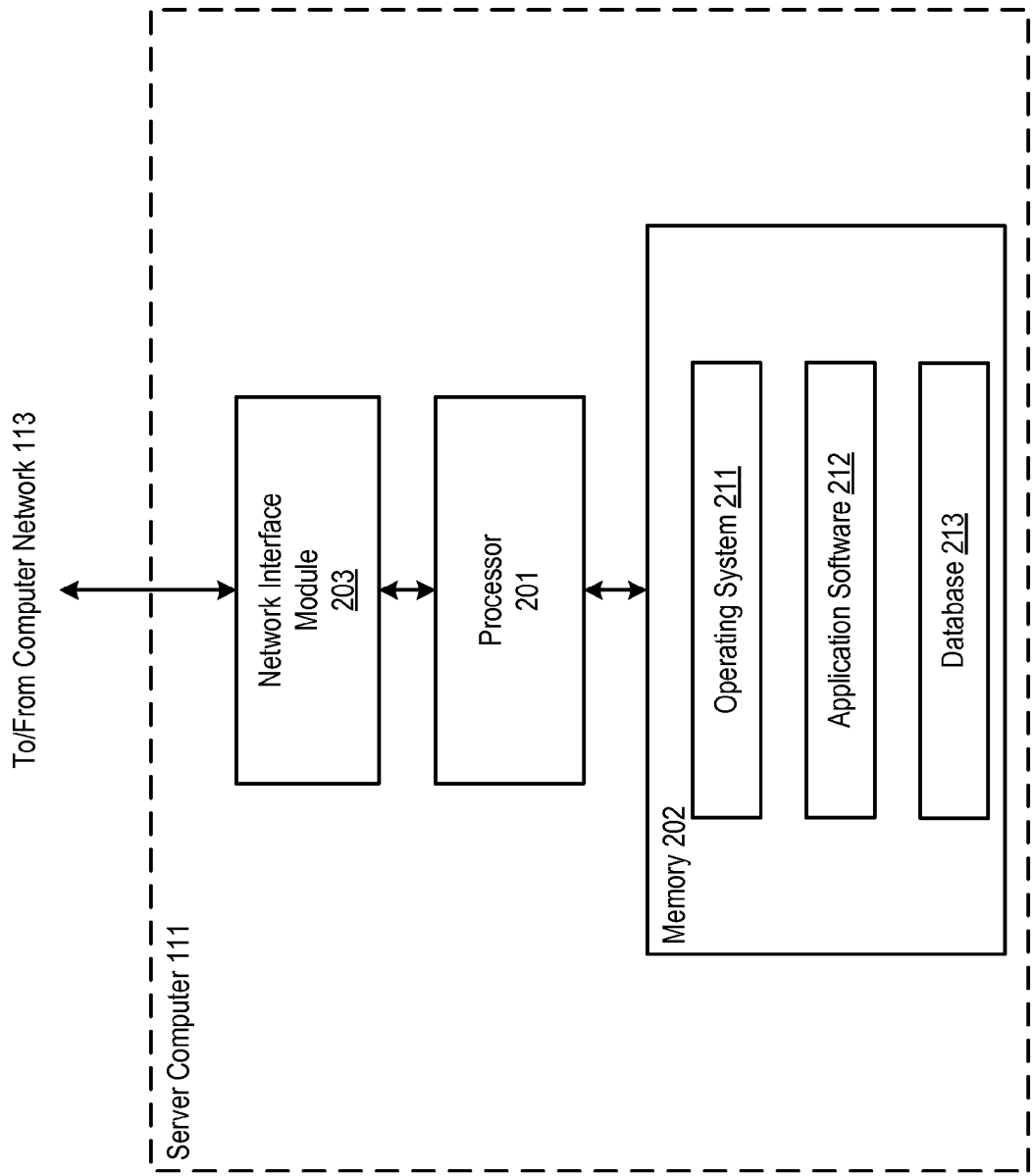
FIG. 2 depicts a block diagram of the salient components of server computer 111, which is part of system 100.

FIG. 2 depicts a block diagram of the salient components of server computer 111 in accordance with an illustrative embodiment of the present invention. Server computer 111 comprises: processor 201, memory 202, and network interface module 203, which are interconnected as shown.

Processor 201 is a general-purpose processor that is configured to execute operating system 211 and application software 212, and to populate, amend, use, and manage database 213, as described in detail below and in the accompanying figures. For the purposes of this specification, a "processor" is defined as one or more computational elements, whether co-located or not and whether networked together or not. It will be clear to those skilled in the art how to make and use processor 201.

Memory 202 is non-transitory and non-volatile computer storage memory technology that is well known in the art (e.g., flash memory, etc.). Memory 202 is configured to store operating system 211, application software 212, and database 213. The operating system is a collection of software that manages, in well-known fashion, server computer 111's hardware resources and provides common services for computer programs, such as those that constitute the application software. The application software that is executed by processor 201 enables server computer 111 to perform the functions disclosed herein. Database 213 comprises information about one or more product units 150 while in the process of manufacturing.

It will be clear to those having ordinary skill in the art how to make and use alternative embodiments that comprise more than one memory 202; or comprise subdivided segments of memory 202; or comprise a plurality of memory technologies that collectively store the operating system, application software, and database.

Network interface module 203 comprises a network adapter configured to enable server computer 111 to transmit information to and receive information from test rig 112, via computer network 113. In addition, network interface module 203 enables server computer 111 to transmit information to and receive information from systems 120 and 130 via telecommunications network 140. It will be clear to those skilled in the art how to make and use network interface module 203.

As mentioned previously, server computers 121 and 131 are similar to server computer 111. Each server computer comprises one or more processors, memory, and network interface modules. It will be clear to those skilled in the art, after reading this specification, how to make and use servers 121 and 131, in part by following the description of server 111.

Figure 3:
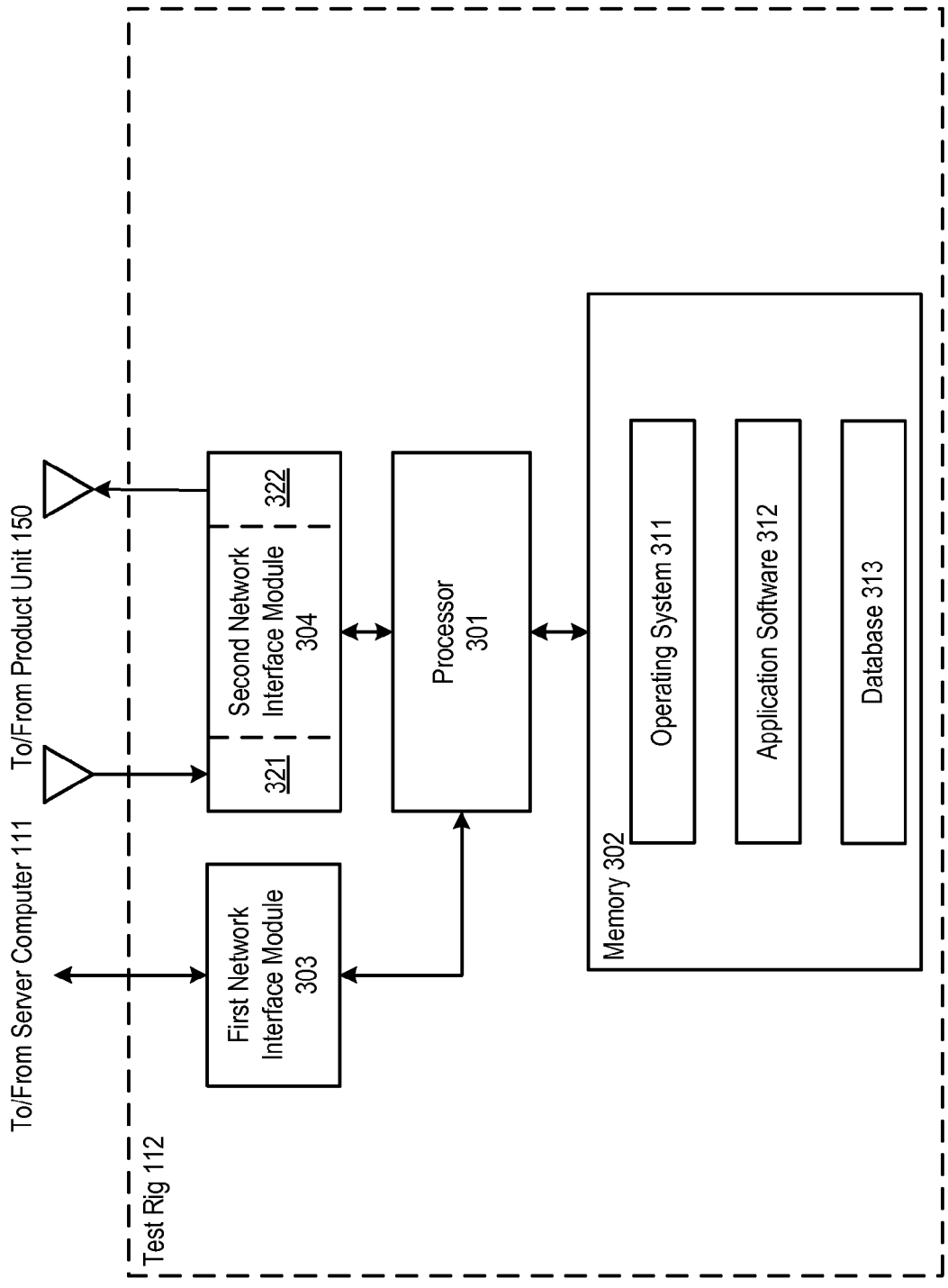
FIG. 3 depicts a block diagram of the salient components of test rig 112, which is part of system 100.

FIG. 3 depicts a block diagram of the salient components of test rig 112 in accordance with an illustrative embodiment of the present invention. Test rig 112 comprises: processor 301, memory 302, first network interface module 303, and second network interface module 304, which are interconnected as shown. A test rig also has access to measurement equipment, which is used to verify if the actual characteristics (e.g., physical, electrical, etc.) of a product unit being tested are within specified tolerance limits. Such measurement equipment can be connected to test rig 112 via first network interface module 303.

Processor 301 is a general-purpose processor that is configured to execute operating system 311 and application software 312, and to populate, amend, use, and manage database 313, including storing measurement results for production quality monitoring, as described in detail below and in the accompanying figures. It will be clear to those skilled in the art how to make and use processor 301.

Memory 302 is non-transitory and non-volatile computer storage memory technology that is well known in the art (e.g., flash memory, etc.). Memory 302 is configured to store operating system 311, application software 312, and database 313. The operating system is a collection of software that manages, in well-known fashion, test rig 112's hardware resources and provides common services for computer programs, such as those that constitute the application software. The application software that is executed by processor 301 enables test rig 112 to perform the functions disclosed herein. Database 313 comprises information about one or more product units 150 while in the process of manufacturing.

It will be clear to those having ordinary skill in the art how to make and use alternative embodiments that comprise more than one memory 302; or comprise subdivided segments of memory 302; or comprise a plurality of memory technologies that collectively store the operating system, application software, and database.

First network interface module 303 comprises a network adapter that is configured to enable test rig 112 to transmit information to and receive information from server computer 111 (e.g., by WiFi, etc.), via computer network 113. It will be clear to those skilled in the art how to make and use first network interface module 303.

Second network interface module 304 comprises a network adapter that is configured to enable test rig 112 to transmit information to and receive information from product unit 150, via Bluetooth Low Energy (BLE) enabled via radio receiver part 321 and radio transmitter part 322, in accordance with an illustrative embodiment of the present invention. In some other embodiments of the present invention, second network interface module 304 can communicate via a different type of wireless network technology standard such as Z-Wave, ZigBee, Wi-Fi, Bluetooth Classic, or Thread, for example and without limitation. In still some other embodiments of the present invention, second network interface module 304 might be combined with first network interface module 303. In any event, it will be clear to those skilled in the art, after reading this specification, how to make and use second network interface module 304.

Figure 4:
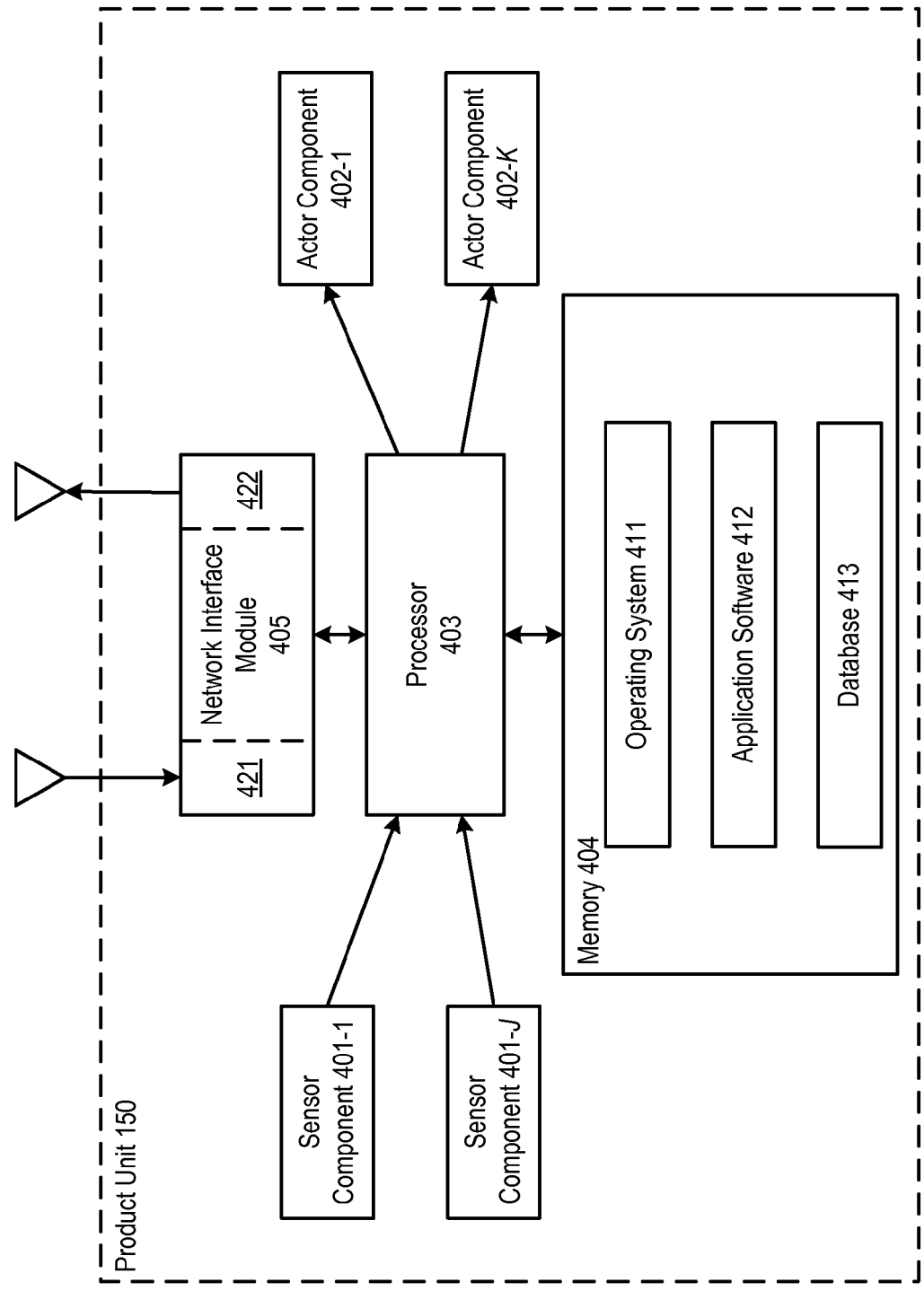
FIG. 4 depicts the salient components of product unit 150, which operates within system 100.

FIG. 4 depicts the salient components of product unit 150 according to an illustrative embodiment of the present invention. According to the illustrative embodiment, product unit 150 is based on a data-processing apparatus whose hardware platform comprises the following electronic components: sensor components 401-1 through 401-J, wherein J is a non-negative integer; actor components 402-1 through 402-K, wherein K is a non-negative integer; processor 403, memory 404, and network interface module 405, interconnected as shown. In some embodiments of the present invention, one or more of the elements described below can be physically integrated with each other. For example and without limitation, in some embodiments, module 404 might provide some or all of the functionalities of processor 401 and/or memory 402.

Product unit 150 comprises the components that are depicted in FIG. 4 and described below, in accordance with an illustrative embodiment of the present invention. However, it will be clear to those skilled in the art, after reading this specification, how to make and use embodiments of the present invention in which product unit 150 is a device that, at a minimum, comprises an electronic module that is configured to store a digitally-signed "nameplate" as described below.

Sensor component 401-$j$, wherein j has a value between 1 and J, inclusive, is an apparatus that comprises memory, processing components, and communication components, and is configured to transmit signals providing sensor-related information, as described in detail below. In accordance with an illustrative embodiment, each sensor component 401-$j$ comprises a sensor, wherein the sensor gathers information about the environment that is accessible by the sensor component.

Each sensor is configured to monitor a particular physical condition in well-known fashion. A sensor senses a change in the condition being monitored and is configured to report a state of the condition by providing input signals to processor 403, wherein the values of the input signals are representative of the states being reported. A given sensor component 401-$j$ can report discrete input signal values and/or a continuum of states and can report states at particular times and/or continuously. For example and without limitation, sensor component 401-$j$ can comprise one or more of the following sensors with respective functions:

i. a motion detection sensor (e.g., a Passive InfraRed [PIR] element, etc.) to detect and report the motion and/or presence of humans. For example, the reported state might be "motion detected" or "motion not detected".

ii. a temperature sensor to detect and report ambient temperature. For example, the reported state might be a temperature value.

iii. a light (luminescence) sensor to detect and report light level (e.g., ambient level, etc.). For example, the reported state might be a light-level value.

iv. a touch sensor to wake up and/or trigger other sensors, particularly those with a higher power draw (e.g., accelerometer, gyroscope, etc.). This sensor can report a touch event to trigger various actions when touched. This sensor can also be used as a protection against theft of a sensor component; for example, the system may sound an alarm when sensor component 301-$j$ is touched or moved. For example, the reported state might be "contact detected" or "contact not detected".

v. an accelerometer (e.g., single-axis, multi-axis, etc.) sensor to detect and report position/orientation (e.g., incline, etc.) and other motion-related events (e.g., taps, bumps, etc.). For example, the reported state might be an orientational value and/or a positional value.

vi. a gyroscope (e.g., single-axis, multi-axis, etc.) to detect and report motion (e.g., shifts, turns, etc.). For example, the reported state might be a translational motion value and/or a rotational motion value.

vii. an air humidity sensor to detect and report humidity level, for the purpose of controlling A/C, fans, and so on. For example, the reported state might be a humidity value.

viii. a carbon dioxide sensor to detect and report carbon dioxide level, for the purpose of controlling A/C, ventilation, and so on. For example, the reported state might be a carbon dioxide level value.

ix. a carbon monoxide sensor to detect and report carbon monoxide level, for the purpose of providing a security/safety alarm function. For example, the reported state might be a carbon monoxide level value.

x. a (natural) gas sensor to detect and report gas, for the purpose of providing a security/safety alarm function. For example, the reported state might be a gas level value.

xi. a flood (water) sensor to detect and report the presence of water, implemented with exposed contact electrodes, for example. For example, the reported state might be "water detected" or "water not detected".

xii. a rain sensor to detect and report whether it is raining outside. For example, the report state might be "raining" or "not raining".

xiii. a radio beacon receiver. In some embodiments of the present invention, component 401-$j$ can be moved around; accordingly, component 401-$j$ is configured to be able to determine and report its location (e.g., relative location, absolute location, etc.) via receiving one or more radiolocation beacons. In some embodiments, the component can detect the proximity of other radio location beacon sources such as smart buttons, key fobs, mobile stations emitting beacon signals, and so on.

xiv. a real-time clock that can be used in conjunction with geolocation information to compute the position of the Sun, making component 401-$j$ aware of the outside light level (e.g., day versus night, etc.), which the component can report on.

xv. an electronic compass. For example, the reported state might be a static "heading" of the sensor component.

xvi. a sensor that is worn or carried by a person (e.g., a Jawbone Up24™ bracelet, etc.), which detects and reports a condition of the person or of the person's immediate environment. An advantage of using such a sensor associated with a person is that can provide a more direct indication of a human-related activity occurring within a building than other sensors associated with the building. Moreover, a sensor associated with a particular person is able to monitor the pace of the particular individual.

xvii. a sensor configured to sense a predetermined movement (e.g., translational, rotational, etc.).

xviii. a virtual "sensor" such as, but not limited to, a web-based service that monitors and reports on one or more environmental conditions, including reports comprising predictions of the future states of one or more of the conditions being monitored. For example, a temperature "sensor" can be a weather-forecasting web service that provides a forecast of a future temperature, future air quality, future cloud cover, future precipitation, and so on.

As those who are skilled in the art will appreciate, after reading this disclosure, sensor component 401-*j* can provide a different function or functions than those described above. Furthermore, product unit 150 can comprise any combination of and any number of sensor components and sensor functions, possibly including none, some, or all of those listed above. The tasks performed by product unit 150 that correspond to these sensor components can be performed within manufacturing system 110 (e.g., for testing purposes, etc.) or can be performed outside of the manufacturing system (e.g., within a home automation environment, etc.), or both.

Actor component 402-*k*, wherein k is equal to 1 through K, inclusive, is an apparatus that comprises memory, processing components, and communication components, and is capable of doing something in the course of being affected by signals originating externally to the actor component, possibly from mobile station 160, or possibly from one or more sensor components (i.e., in the product unit or a different one) and processed by processor 403. In accordance with an illustrative embodiment of the present invention, each actor component 402-*k* takes decisions that are based on signals from one or more sources and performs appropriate actions upon the actor's environment. Each actor component acts upon its environment in well-known fashion. In some embodiments, an actor component is or comprises an actuator, as is known in the art.

Actor component 402-*k* is configured to receive, transmit, process, and/or relay signals conveying data, as well as being configured to affect a condition, physical or otherwise, in its environment. For example and without limitation, the condition being affected can be:

i. lighting, which can be adjusted (e.g., turning on or off, changing color or mood, displaying a picture or pattern, etc.).
  ii. sound, which can be adjusted (e.g., increasing or decreasing volume, changing playlist or mood, turning on/off, selecting signal source, etc.).
  iii. room climate, which can be controlled (e.g., increasing or decreasing temperature, humidity, air fragrance, etc.).
  iv. temperature of a local object or substance (e.g., cooking food, boiling liquid, etc.).
  v. an alert, which can be generated (e.g., of an email, of an SMS message, etc.).
  vi. monitoring by a camera, which can be panned or tilted.
  vii. home entertainment/home cinema settings (e.g., selecting one or more of signal source, streaming application, multimedia to play, audio language, subtitles, chapter, play/pause/stop, rewind/fast forward, etc.).
  viii. connected/smart TV features (e.g., selecting application to be launched, navigating through on-screen menus, etc.).
  ix. virtual keyboard—navigation on virtual keyboard displayed by other device (e.g., TV, set-top box, etc.).
  x. control of shades/window coverings.
  xi. access control (e.g., unlocking/locking doors, opening/shutting doors, authorizing access to selected rooms or zones, etc.).

As those who are skilled in the art will appreciate, after reading this disclosure, actor component 402-*k* can provide a different function than those described above. Furthermore, product unit 150 can comprise any combination of and any number of actor components, possibly including none, some, or all of those corresponding to the affected conditions listed above. The tasks performed by product unit 150 that correspond to these actor components can be performed within manufacturing system 110 (e.g., for testing purposes, etc.) or can be performed outside of the manufacturing system (e.g., within a home automation environment, etc.), or both.

As those who are skilled in the art will appreciate, after reading this disclosure, product unit 150 comprising one or more actor functions can be in a variety of forms. For example and without limitation, such forms include a light bulb as part of a lighting system, a media player as part of an audio/video system, a heater as part of an environment control system, an outgoing-email server as part of a messaging system, an actor in a water sprinkler system, a robot or robotic arm, a pan/tilt camera, a switch, a motor, a servo mechanism, a kettle for boiling liquids, and so on.

Processor 403 is a processing device, such as a microprocessor that is well known in the art. Processor 403 is configured such that, when operating in conjunction with the other components of product unit 150, processor 403 executes software, processes data, and telecommunicates according to the operations described herein.

Memory 404 is non-transitory and non-volatile computer storage memory technology that is well known in the art (e.g., flash memory, etc.). Memory 404 is configured to store operating system 411, application software 412, and database 413. The operating system is a collection of software that manages, in well-known fashion, product unit 150's hardware resources and provides common services for computer programs, such as those that constitute the application software. The application software that is executed by processor 403 according to an illustrative embodiment enables product unit 150 to perform the functions disclosed herein. Database 413 comprises information about each sensor component and about each actor component, information about product unit 150 in general, and information that is digitally signed as described herein. For example and without limitation, database 413 stores a digitally-signed document when received by the product unit from another device (e.g., test rig 112, etc.).

It will be clear to those having ordinary skill in the art how to make and use alternative embodiments that comprise more than one memory 404; or comprise subdivided segments of memory 404; or comprise a plurality of memory technologies that collectively store the operating system, application software, and database.

Network interface module 405 comprises a network adapter configured to enable product unit 150 to telecommunicate with other devices and systems, by receiving signals therefrom and/or transmitting signals thereto via radio receiver 421 and radio transmitter 422, respectively, via Bluetooth Low Energy (BLE) in accordance with an illustrative embodiment of a present invention. For example, network interface module 405 communicates with one or both of test rig 112 and mobile station 160. In some other embodiments of the present invention, network interface module 405 can communicate via one or more different types of wireless network technology standards, in addition to or instead of BLE, such as Z-Wave, ZigBee, Wi-Fi, Bluetooth Classic, or Thread, for example and without limitation. In a multiple-protocol configuration, a first network adapter can support a first standard (e.g., BLE, etc.), a second network adapter can support a second standard (e.g., WiFi, etc.), and so on, for example and without limitation.

Module 405 is based on an LSR TiWi-uB1 BLE module according to an illustrative embodiment of the present invention. In some other embodiments of the present invention, module 405 can be based on another type of module. As those who are skilled in the art will appreciate after reading this specification, module 405 can comprise one or more of the elements that are depicted in FIG. 4 as being separate from module 405, such as processor 403 and/or memory 404.

In accordance with an illustrative embodiment, product unit 150 uses network interface module 405 in order to telecommunicate wirelessly with external devices. It will be clear to those skilled in the art, however, after reading the present disclosure, how to make use and use various embodiments of the present invention in which product unit 150 communicates via a different type of wireless network (e.g., personal area network, local area network, etc.), or via a wired protocol (e.g., X10, KNX, etc.) over physical media (e.g., cable, wire, etc.) with one or more external devices, either in addition to or instead of the wireless capability provided by module 405. In any event, it will be clear to those skilled in the art, after reading this specification, how to make and use network interface module 405.

Each manufactured product unit 150 has identification data that are stored internally. This is referred to herein as a "digital nameplate." This data represents, among other things, one or more of the product unit's i) unique identifier (e.g., MAC address, serial number, etc.), ii) brand, iii) function, and so on. In order to prevent a manufacturer from creating illegal copies of the product unit or manufacturing a greater number of product units than was ordered, each data set is digitally signed while on the production line by using asymmetric cryptography. As those who are skilled in the art will appreciate after reading this specification, a different encryption technique can be used. The digitally-signed data set is then written into product unit 150's memory where it can be used for verification and for other purposes as disclosed herein. In particular, a first digitally-signed data set can be used to control the use of one or more software modules that are provided by the software owner.

In accordance with an illustrative embodiment of the present invention, a crucial part of the nameplate signing is that data that are undergoing signature contain at least one globally-unique identifier, which can be used to identify cloning attempts. In some embodiments of the present invention, a media access control (MAC) address can serve as this identifier for BLE communications and for communications based on other protocols. As this address is used to address the devices on the data-link layer, any duplications of a MAC address, or other globally-unique identifier for that matter, in a single network can be detected and cause communications to malfunction. As those who are skilled in the art will appreciate after reading this specification, a globally unique identifier that is different from a MAC address can be used (e.g., IPv6 address, etc.).

As described above, product unit 150's globally unique communication address or identifier, with or without some additional information that is important from a business perspective, is used for a digital signature, which is subsequently used to verify the authenticity of the product unit. Consequently, if one wants to counterfeit or clone the device, the counterfeiter must clone the communications address as well, in order to keep the digital signature valid. In some cases, address cloning by itself may render product unit 150 useless, in that a given computer network will inherently be unable to handle communications properly when multiple units with the same address are present in the same computer network. When cloned units are present across multiple and distinct computer networks—or even within the same network, for that matter—such cloning can be detected effectively by a technique disclosed herein.

According to an illustrative embodiment, more than one digital signature can be used in order to control and protect the use of different intellectual property items by product unit 150. As already described, a first digital signature is used by the software owner of a software module to be licensed for use in the product unit. A second digital signature can be used by the brand owner of a brand to be licensed for use in the product unit, for example and without limitation. As those who are skilled in the art will appreciate after reading this specification, a different number of independent signatures is possible than the two in the foregoing example. Furthermore, any combination of signatures can be used in order to protect different features that constitute product unit 150.

The brand owner's involvement in nameplate signing might be considered optional. For example, with original equipment manufacturer (OEM) products, there is no third party involved, so a signing process that occurs only between the software owner and the manufacturer might be considered adequate.

Figure 5:
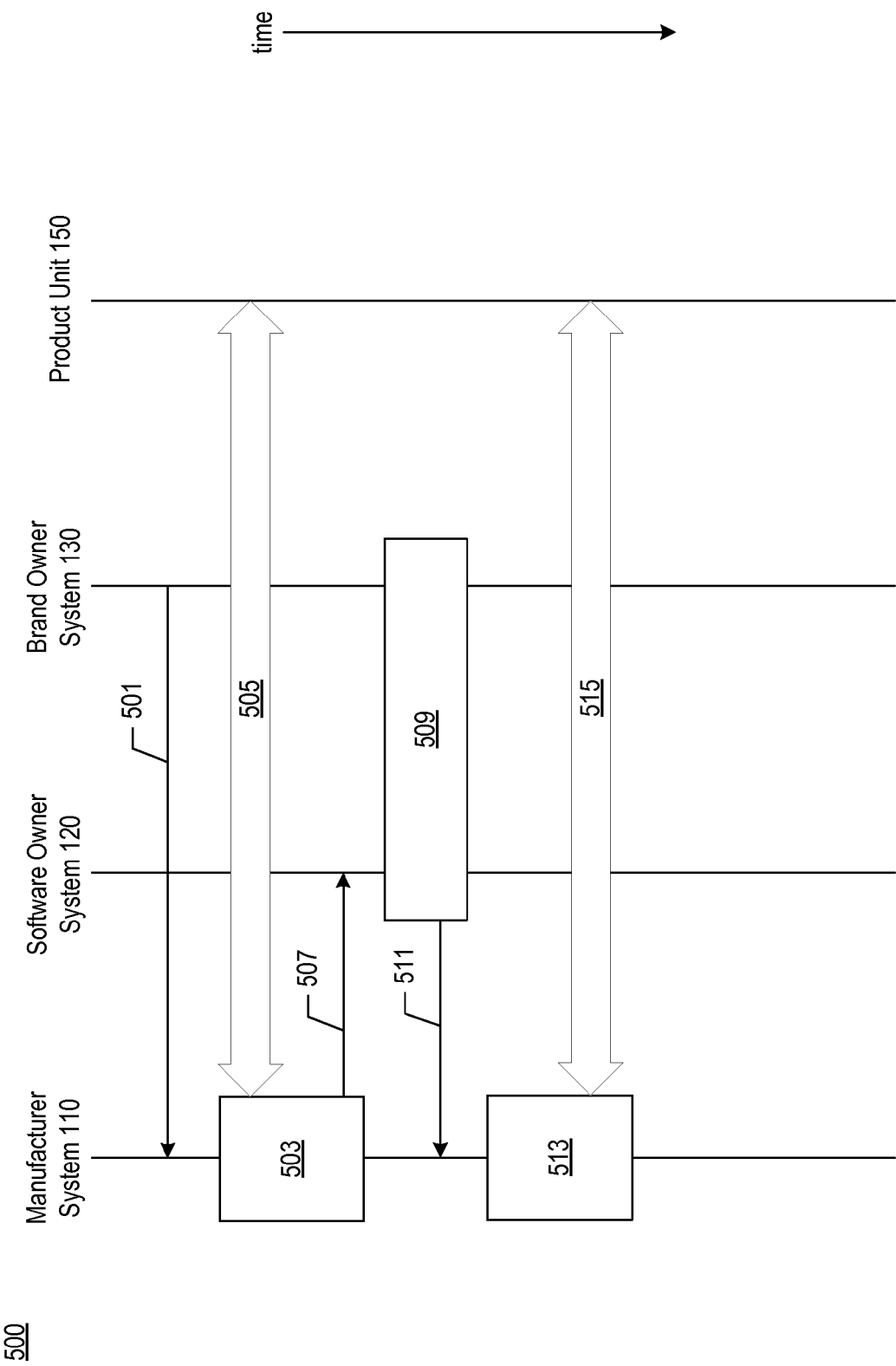
FIG. 5 depicts some salient operations of method 500 according to an illustrative embodiment of the present invention, in which one or more licensed products are administered.

FIG. 5 depicts some salient operations of method 500 according to an illustrative embodiment of the present invention, in which one or more licensed products are administered, including one or more of i) a software module, ii) a product brand, and iii) an electronics module (e.g., as part of product unit 150, etc.) with which the software module, the brand, and/or another item to be licensed is associated. FIG. 5 can be regarded as an overview, with subsequent figures providing additional details for some of the operations depicted.

In regard to method 500, as well as to the methods depicted in the other flowcharts and message flow diagrams contained herein, it will be clear to those having ordinary skill in the art, after reading the present disclosure, how to make and use alternative embodiments of the disclosed methods wherein the recited operations, sub-operations, and messages are differently sequenced, grouped, or sub-divided—all within the scope of the present invention. Also, it will be further clear to those skilled in the art, after reading the present disclosure, how to make and use alternative embodiments of the disclosed methods wherein at least some of the described operations, sub-operations, and messages are optional, are omitted, or are performed by other elements and/or systems.

As depicted in FIG. 5, brand owner system 130 provides manufacturer system 110 with a product order via message 501, including an order identifier (order ID). In some alternative embodiments of the present invention, the order can originate elsewhere instead.

Server computer 111 of system 110 receives message 501 and, as a result, initiates in accordance with operation 503 (further depicted in FIG. 6) a sequence of transactions 505 with product unit 150, via test rig 112. As part of transaction sequence 505, test rig 112 tests the product unit (e.g., assesses performance, etc.). Also as part of transactions 505, legally manufactured product unit 150 has a license tag programmed in a non-volatile memory as part of a personalization process. Contingent upon a successful test (e.g., a semi-automatic test, etc.), once the product unit is considered valid and ready to be packaged, test rig 112 initiates the personalization process and, in doing so, performs the following actions:

i. reads, or otherwise receives, a data set or equivalent from product unit 150, including its media access control (MAC) address, for example and without limitation.

ii. establishes, via server computer 111, a secure connection to software owner system 120's web-based, licensing service, via message 507. As those who are skilled in the art will appreciate, this can be accomplished through one or more remote API (application programming interface) calls by using well-known, secure methods (e.g., web services, RPC, SOAP, etc.). The licensing service provides traceability and accountability for licenses issued.

iii. receives, via server computer 111, a software license tag from the licensing service via message 511. Using software owner system 120's private key, the software license tag is determined mathematically in accordance with operation 509 (further depicted in FIG. 7) as a digital signature of the MAC address of the data set and, optionally, of other information. In some embodiments, a product unit identifier different than the MAC address is signed, while in some other embodiments a different datum entirely is signed. In some embodiments, the private key is 2048 bits long, and the encryption performed is based on the RSA algorithm, as is known in the art.

iv. receives, via server computer 111, a brand license tag via message 511 or a different message. Using brand owner system 130's private key, the brand license tag is determined mathematically in accordance with operation 509 as a digital signature of a brand identifier and, optionally, of other information. In some embodiments, the private key is 2048 bits long, and the encryption performed is based on the RSA algorithm, as is known in the art. In some embodiments, manufacturer system obtains the brand license tag directly from brand owner system 130.

v. writes the software license tag to product unit 150's firmware system using dedicated characteristics, in accordance with operation 513 (further depicted in FIG. 8) and through a sequence of transactions 515. The firmware system checks that the license tag was not written before (i.e., is zeroed) and then writes the tag to a dedicated portion of memory, which in some embodiments is one-time programmable memory. When a brand license tag is used, product unit 150 writes it to a dedicated portion of memory, which in some embodiments is one-time programmable memory.

As those who are skilled in the art will appreciate after reading this specification, the same test rig 112 (or other tester or testing device) can perform both the testing and personalization processes, or different test rigs can perform the testing and personalization processes, for one or more product units.

After one or more of the operations depicted in FIG. 5 have occurred, one or more billing account statements can be issued to the affected parties. In some embodiments, software owner system 120 can issue such a statement to manufacturer system 110 and/or brand owner system 130, indicating the number of manufactured and/or licensed units. For example, brand owner system 130 can verify the statement against their brand licensing agreement and choose to accept or reject the invoice.

Figure 6:
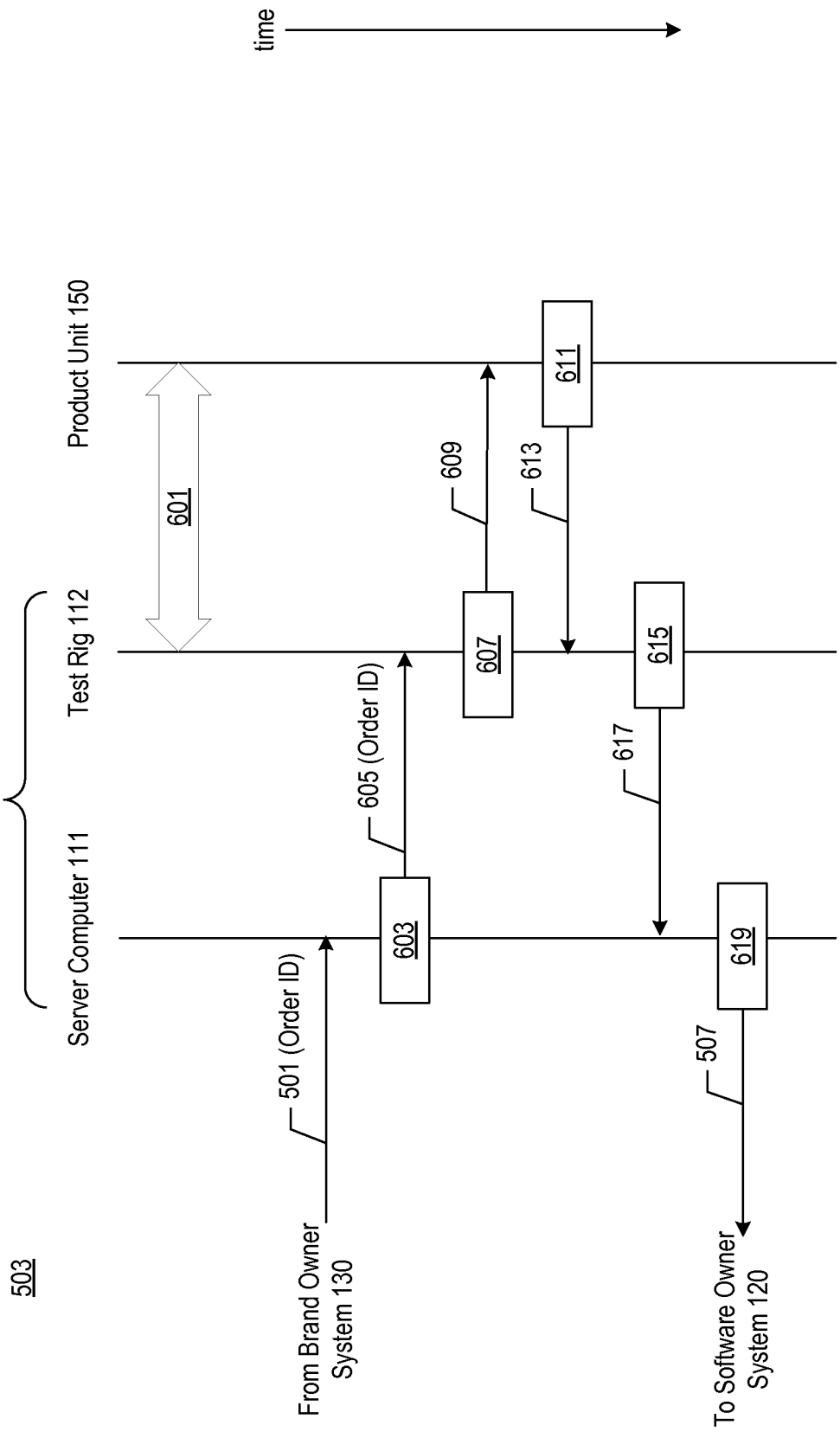
FIG. 6 depicts some salient sub-operations of operation 503 as part of method 500, in which manufacturer system 110 performs initial interactions with product unit 150.

FIG. 6 depicts some salient sub-operations of operation 503 according to an illustrative embodiment of the present invention, in which manufacturer system 110 performs initial interactions with product unit 150. At some point in time, a product unit 150 boots up, connects to test rig 112, and undergoes tests, as denoted by transactions sequence 601.

In some embodiments, test rig 112 identifies a product unit that it should connect to by using data that are broadcast by the particular product unit. This can be used, for example and without limitation, to avoid interference between workstations that are concurrently working with different product units while eliminating the need for a Faraday cage, at least during some stages of manufacture. In some embodiments, the data that can be used to assign the product unit to a specific test rig comprises i) a Line identifier, which can be a hardcoded identifier of the test rig to be used, and ii) the Phase, which depends on the current stage of manufacturing (e.g., a sub-state of a state machine, etc.). Identification of the phase enables process separation; for example, four different test rigs concurrently can be conducting i) some testing, ii) remaining tests, iii) personalization without PIN setup, and iv) PIN programming and labeling.

In accordance with operation 603, server computer 111 has received order message 501 comprising an order ID from brand owner system 130. In some other embodiments of the present invention, message 501 is received from another entity. Server computer 111 passes the order ID to test rig 112 in message 605.

In accordance with operation 607, test rig 112 recognizes product unit 150, at least in part because of boot sequence 601, and reads the order ID received in message 605. Based on one or both of the foregoing actions, test rig 112 requests unit 150's identifier via message 609, if not already known. Product unit 150 provides the identifier in accordance with operation 611 via message 613.

In accordance with operation 615, test rig 112 transmits the product unit identifier (ID) via message 617 to server computer 111. The server computer then requests one or more license tags from software owner system 120, in accordance with operation 619 and via message 507, which contains the product unit's ID.

Figure 7:
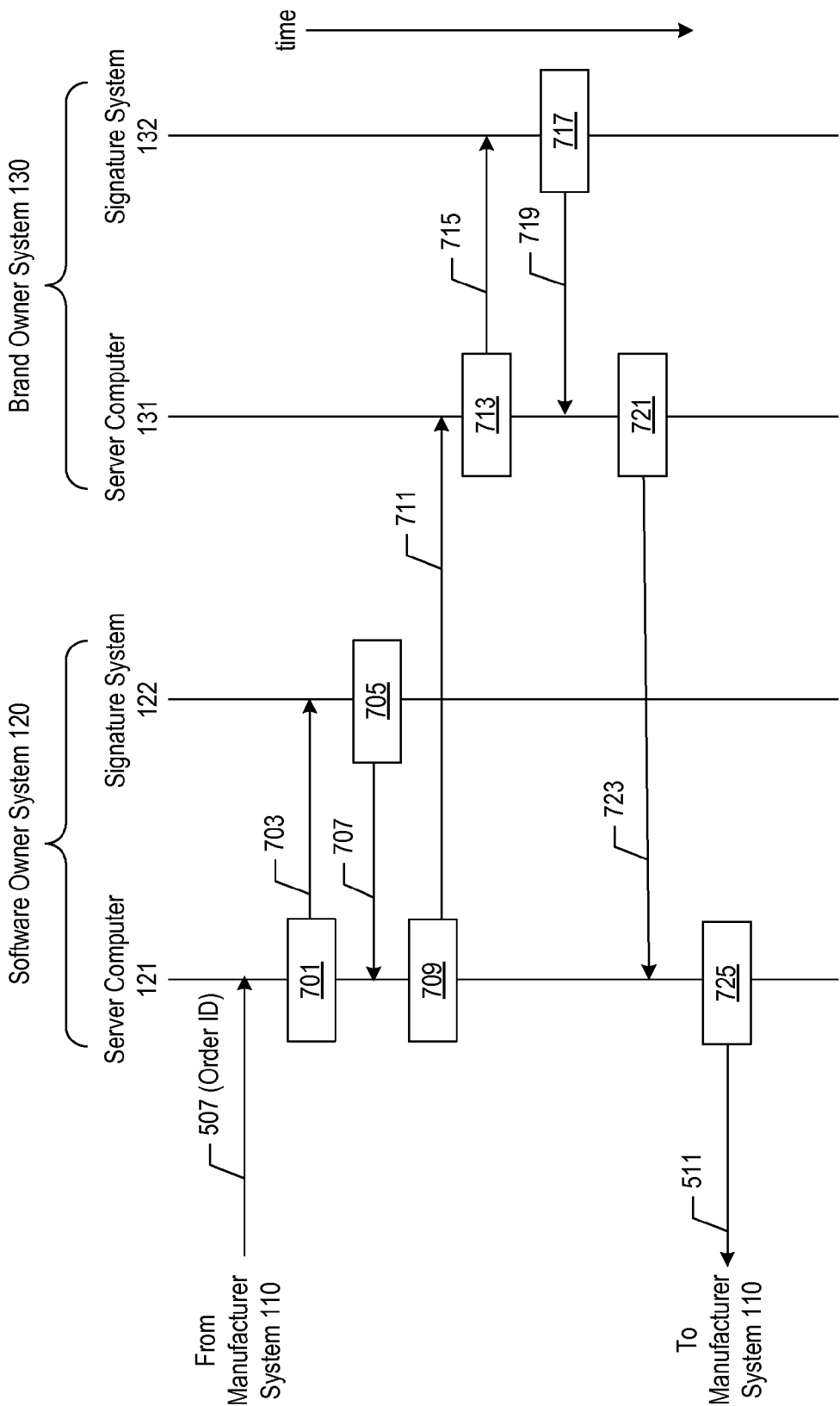
FIG. 7 depicts some salient sub-operations of operation 507 as part of method 500, in which one or both of software owner system 120 and brand owner system 130 interact with manufacturer system 110.

FIG. 7 depicts some salient sub-operations of operation 507 according to an illustrative embodiment of the present invention, in which one or both of software owner system 120 and brand owner system 130 interact with manufacturer system 110, for the purpose of providing one or more license tags for product unit 150.

In accordance with operation 701, server computer 121 of system 120 receives message 507, which contains the order ID and the product unit ID. Based on having received the order ID or the product unit ID, or both, server 121 transmits the order identifier and product unit identifier to signature system 122 via message 703. In some embodiments, the two types of identifiers are transmitted to signature system 122 via separate messages. For example and without limitation, the order ID can be provided in a first message and all of the product IDs in a second, the order ID can be provided in a first message and each product ID in its own message, etc.

In accordance with operation 705, signature system 122 receives the order ID, looks it up in its database, and recognizes that this particular order is for a particular number of units (e.g., ten thousand units, etc.), to be licensed to use a particular software module. In response to this, signature system 122 digitally signs each product unit ID in the order by using a hash function and the private key of the software owner, as part of a public-key cryptography scheme as is known in the art, in which the signed ID is determined mathematically. As those who are skilled in the art will appreciate after reading this specification, signature system 122 can sign a product unit ID via a different scheme than described. Signature system 122 passes each signed product unit ID (i.e., the digital signature of the product unit ID) back to server computer 121 via one or more messages 707.

In some embodiments, signature system 122 also recognizes that the units are also to be licensed with a particular brand in mind and indicates this to server computer 121. Alternatively, server computer 121 instead of signature system 122 can determine that this brand-related licensing is to be performed. In the embodiments in which brand-related licensing is to be performed, server computer 121 also communicates with brand owner system 130, for the purpose of obtaining a signed brand ID. In accordance with operation 709 and based on having received the order ID or the product unit ID or message 707, or some combination thereof, server 121 transmits a brand identifier (brand ID) to signature system 122 via message 711. The brand ID indicates the brand that is to be licensed. Server computer 121 obtains the brand ID from a database (e.g., from signature system 122, etc.). In some embodiments, server computer 121 instead transmits a different indicium (e.g., order ID, etc.) to brand owner system 130, which then determines the applicable brand ID.

In accordance with operation 713, server computer 131 receives message 711 and forwards the received brand ID to signature system 132 via message 715. In accordance with operation 717, signature system 132 receives the brand ID, looks it up in its database, and verifies that this particular brand is valid for use. In response to this, signature system 132 digitally signs the brand ID by using a hash function and the private key of the brand owner, as part of a public-key cryptography scheme as is known in the art, in which the signed ID is determined mathematically. As those who are skilled in the art will appreciate after reading this specification, signature system 132 can sign a brand ID via a different scheme than described. Signature system 132 passes each signed brand ID back to server computer 131 via message 719 (i.e., the digital signature of the brand ID). Server computer 131 receives message 719 and, in accordance with operation 721, forwards the signed brand ID to server computer 121 via message 723.

In accordance with operation 725 and in response to having received the signed product unit ID or IDs in message 707 and, if applicable, the signed brand ID in message 723, server computer 121 transmits the received signed ID or IDs to manufacturer system 110 via message 511.

Figure 8:
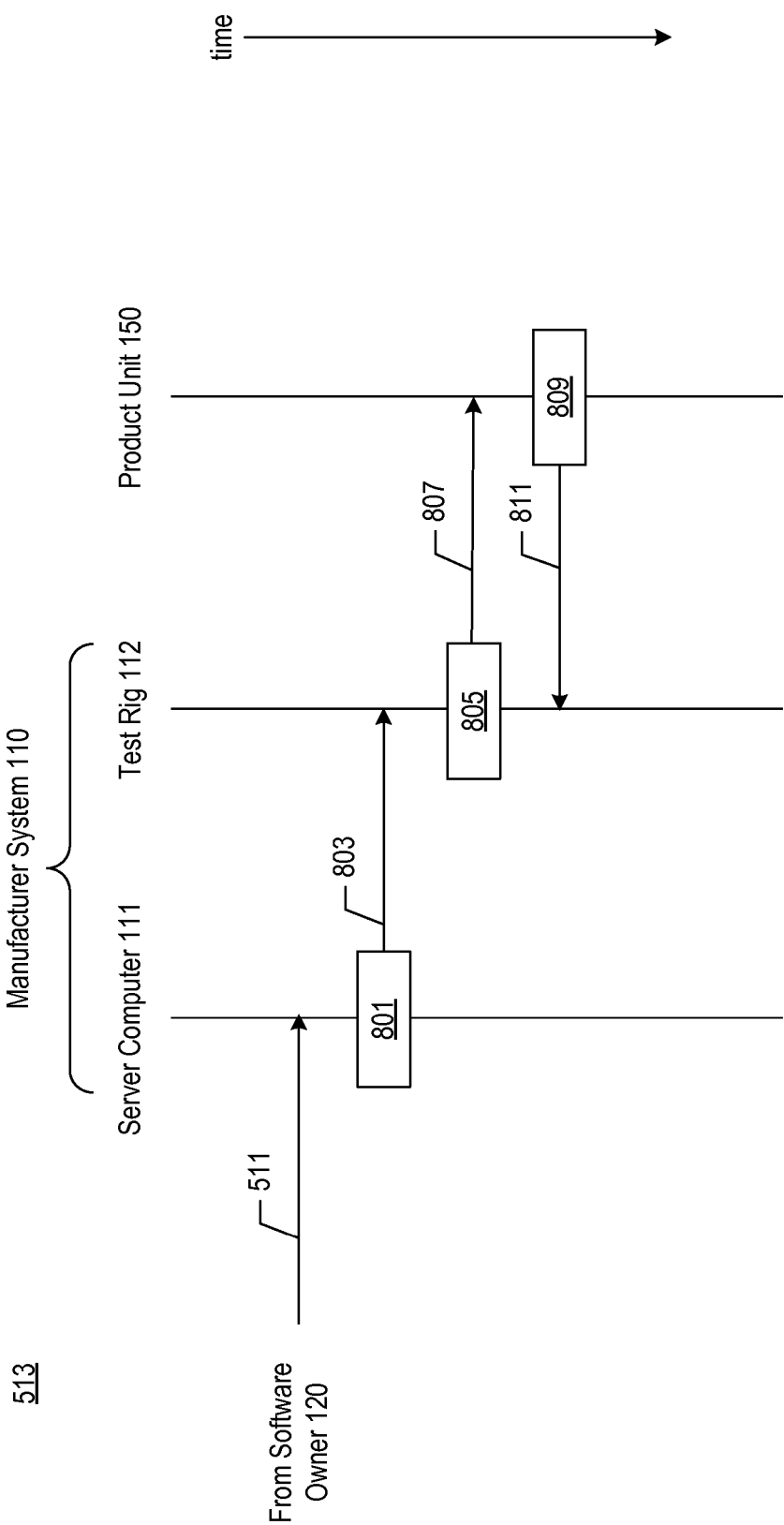
FIG. 8 depicts some salient sub-operations of operation 513 as part of method 500, in which manufacturer system 110 processes received signed product unit IDs and a received signed brand ID.

FIG. 8 depicts some salient sub-operations of operation 513 according to an illustrative embodiment of the present invention, in which manufacturer system 110 processes the received signed product unit ID(s) and signed brand ID, for the purpose of storing one or more license tags into product unit 150.

In accordance with operation 801, server computer 111 receives the signed IDs in message 511 and forwards the received IDs to test rig 112.

In accordance with operation 805, test rig 112 transmits via message 807 the signed product unit ID to the corresponding product unit 150, for each digitally signed product unit ID received. In this process of "burning into memory" one or more signed identifiers, more than one message 807 might actually be exchanged between test rig 112 and each product unit 150. In some embodiments, test rig 112 also transmits to the product unit the data comprising that product unit identifier that were actually signed by signature system 122.

Test rig 112 also transmits the signed brand ID, if available, to product unit 150. In some embodiments, test rig 112 also transmits to the product unit the data comprising the brand identifier that were actually signed by signature system 132.

In some embodiments, test rig 112 also transmits to the product unit one or more digital certificates that can be used to verify the digitally-signed data. A digital certificate, which is known in the art, is also known as a "public key certificate." Such a digital certificate can be obtained from a third-party source, such as certificate authority 180, and each digital certificate can be established at the time that the corresponding private key for the software owner or the brand owner is established.

In accordance with operation 809, product unit 150 stores its signed product unit ID as part of a first digitally-signed document. In some embodiments, the first digitally-signed document might also comprise the original data that was signed, or the corresponding digital certificate, or both. If a brand license is also in effect, product unit 150 stores the signed brand ID as part of a second digitally-signed document. In some embodiments, the second digitally-signed document might also comprise the original data that was signed, or the corresponding digital certificate, or both.

Product unit 150 then transmits an acknowledgment via message 811 back to test rig 112, which acknowledgment can then be transmitted to server computer 111 and to other systems (e.g., systems 120 and/or 130, etc.), if needed.

In some embodiments of the present invention, unless properly tested and licensed, product unit 150 remains in a manufacturing state and is not usable by the end user. Once properly licensed, unit 150 is put in a usable state.

Figure 9:
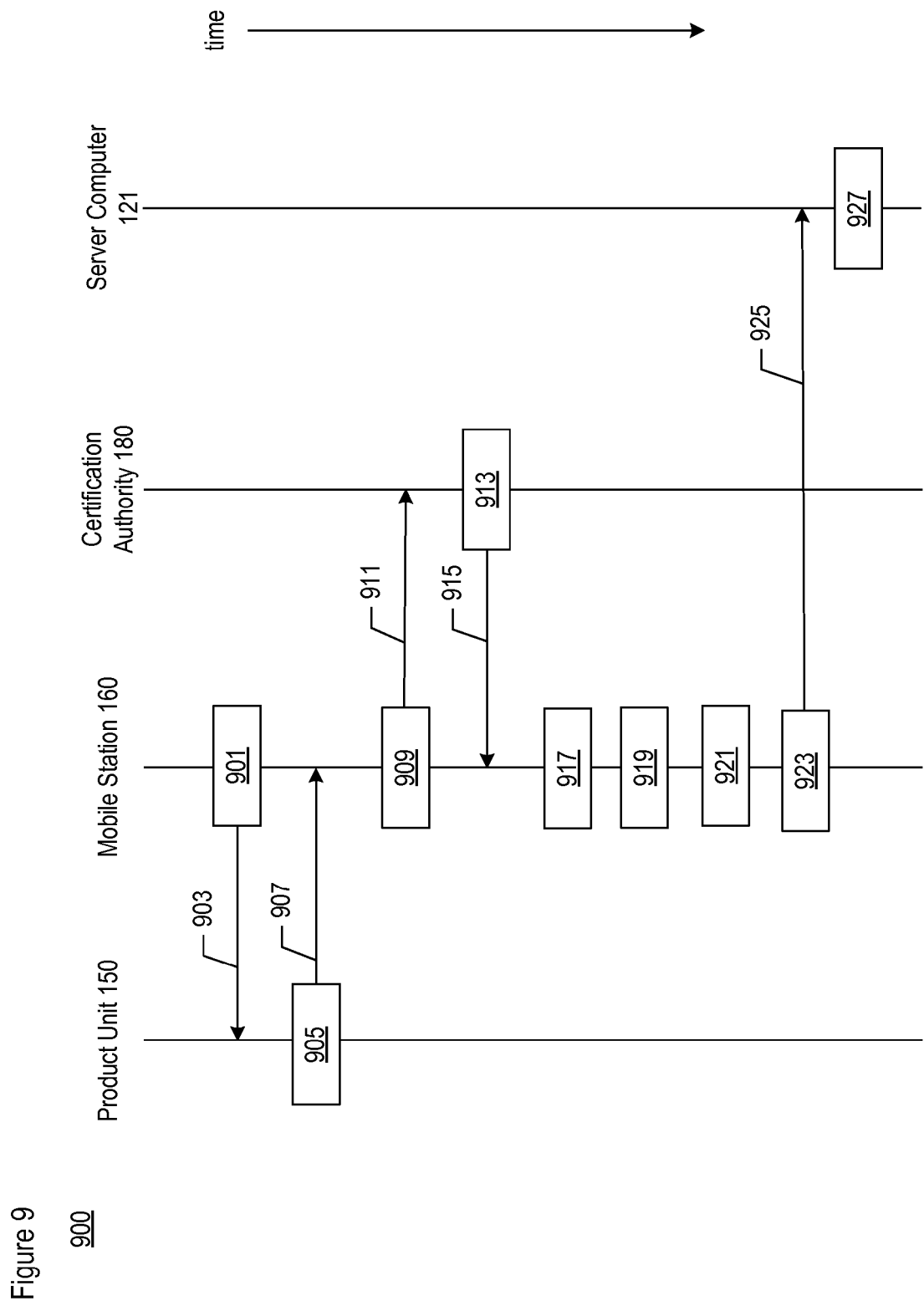
FIG. 9 depicts some salient sub-operations of operation 900 according to an illustrative embodiment of the present invention, in which mobile station 160 executes a software application that controls product unit 150.

FIG. 9 depicts some salient sub-operations of operation 900 according to an illustrative embodiment of the present invention, in which mobile station 160 executes a software application (i.e., an "app") that controls product unit 150. It is assumed in the depicted message flow that a user (e.g., a customer, etc.) now has possession of product unit 150 (e.g., a kettle, etc.), installs it (e.g., in the kitchen, etc.), and downloads the controlling software app into his mobile station 160 (e.g., a smartphone, etc.). As those who are skilled in the art will appreciate after reading this specification, mobile station 160 can instead be a different type of device.

In accordance with operation 901 and through the downloaded app, mobile station 160 recognizes the product unit and requests via message 903 i) the stored software license signed with the software license tag and ii) the stored brand identifier (or license) signed with the brand license tag.

In accordance with operation 905, product unit 150 responds by transmitting via message 907 the requested information.

In accordance with operation 909, mobile station 160 receives the requested information and, in response, requests via message 911 i) the digital certificate associated with the public key for verifying the signed software license signed with the software license tag and ii) the digital certificate associated with the public key for verifying the signed brand license signed with the brand license tag, for the purpose of verifying the signatures. Mobile station 160 makes the request for each digital certificate to the certification authority 180 that is responsible for each public key, in well-known fashion. Although a single certification authority is depicted, in some embodiments different certification authorities can be used for the different public keys.

In accordance with operation 913, certification authority 180 in response provides the digital certificates back to mobile station 160 via one or more messages 915.

In accordance with operation 917, mobile station 160 via the controlling app verifies the signatures using the software-owner public key and the brand-owner public key received the one or more messages 915, in well-known fashion.

In accordance with operation 919, if the software license has been verified to be valid, the app being executed by mobile station 160 enables the licensed software embedded in product unit 150 to be used. In some embodiments, mobile station 160 enables the software embedded in product unit 150 to be used only if the license is verified to be valid.

In accordance with operation 921, if the brand license has been verified to be valid, the app being executed by mobile station 160 displays an indicium of the licensed brand (e.g., displays a branded icon on the phone screen, etc.). In some embodiments, mobile station 160 displays an indicium of the brand only if the license is verified to be valid.

With regard to verifying the brand license to be valid, in some embodiments, additional features can be enabled if the license is determined to be valid.

In some alternative embodiments of the present invention, instead of mobile station 160 performing the check of the signature to determine whether the signature is valid or invalid, product unit 150 performs a self-check of the signature. In such embodiments, product unit 150 is treated as being in a trusted execution environment, in which no third party or attacker can inject or run any non-authorized code in the unit's processor. The trusted public keys corresponding to software owner system 120 and/or brand owner system 130 are contained within the firmware of product unit 150. As a result, neither mobile station 160 nor certification authority 180 are required for the self-check. In some other embodiments, however, product unit 150 independently of mobile station 160 can interact with certification authority 180 for the purpose of performing the check of the signature (e.g., in accordance with one or more of tasks or messages 909 through 917, etc.). Product unit 150 can perform the self-check as part of a boot-up sequence or whenever there is a predetermined task or other function executed by the product unit (e.g., pairing with mobile station 160, etc.). When product unit 150 performs the check, the only trusted execution environment that is needed is its processor running the software owner's code in the product unit.

Regardless of which device checks the signature (i.e., the mobile station or the product unit), one or more actions can be performed, or denied, based on the outcome of the verification. The mobile station app serving as the checker, for example and without limitation, can decline to communicate with the product unit, can prompt its user to purchase on-line a valid license and then writes it to the module, as described below, or can transmit a disable command to the product unit, whereupon the product unit deactivates one or more of the functions that it is otherwise able to perform, either temporarily or permanently. Product unit 150 serving as the checker, for example and without limitation, can decline to perform one or more functions, can enter a limited functionality mode such as operating with a reduced radio range or performing only basic functions (e.g., providing on/off lamp switching but not lamp dimming, etc.), or can provide error-state information and the error reason to a connected application, in order to explain to a user what is happening.

In accordance with operation 923 in FIG. 9, mobile station 160 reports via message 925 product unit 150's communications address to server computer 121, which processes the received report as described here and in accordance with operation 927. In some embodiments of the present invention, the software owner entity, or some other authorized entity for that matter, can monitor for duplicates of the unique identifier globally, for example, by making the controlling applications executing on multiple mobile stations 160 report, periodically or sporadically, the visible MAC addresses to a central server computer (e.g., server computer 121, etc.). Alternatively, a device or system different than station 160 can report the visible address (e.g., a home gateway, etc.). If two or more systems report the same address, the cloning event can be proven by tracing back to one or more events occurring at a particular manufacturing line or lines. Each device that executes the user application can perform this, for one or more product units that it controls. An algorithm working on the server computer can then compare the incoming reports from the different devices, in order to determine additional details.

By comparing the data from the incoming reports, the server computer in accordance with operation 927 can determine not only that a MAC address has been spoofed, but also details such as the particular origin and/or circumstances of the spoofing or manufacture of a device (e.g., the particular manufacturer, the particular manufacturing location, the time and date of a particular manufacturing event, etc.). For example and without limitation, the comparing, and the resulting details, can be based on one or more of the following:

i) the physical locations or geolocations (e.g., dwelling, city, country, region, etc.) of one or more product units;
ii) the locations, positions, and/or orientations of two or more product units with respect to each other;
iii) whether one or more product units are within a predetermined distance of a particular product unit (e.g., the product unit corresponding to a just-received report, etc.);
iv) the times that events occur involving two or more product units; and
v) whether the times that events occur involving one or more product units are within a predetermined interval of the time that an event occurs at a particular product unit.

In some embodiments, the server computer can take resulting action, such as transmitting a message to report the cloning to another system (e.g., brand owner system 130, manufacturer system 110, etc.) or to direct mobile station 160 to disable one or more product units, for example and without limitation.

The operations depicted in FIG. 9 can be used to provide intellectual property owners with traceability and to block any potential counterfeiting. For example, a manufacturer—either the one controlling manufacturer system 110 or someone else—might have decided not to stop the manufacturing line after producing an ordered 10,000 units, and went on to manufacture another 50,000 units for other markets. The unscrupulous manufacturer would not be able to get away with profiting from the unlicensed units. This is because after issuing the 10,000 licenses for a particular order (represented by an order ID), software owner system 120 would refuse to issue any more licenses and brand owner system 130 would refuse to digitally sign any more brand identifiers. Although the manufacturer kept the production line running to produce the extra 50,000 units, those product units would not have a valid software license or brand license. This means that mobile station 160's software app would verify them negatively, and it would not allow them to be presented or controlled. Thus, the products would be of diminished value to their users, if not valueless.

A key difference between product units having licensed software and those that do not is in the set of intellectual property rights obtained through software owner system 120. Accordingly, telecommunications system 100 enables obtaining a license on the retail level, in addition to enabling licensing to manufacturers and brand owners on the wholesale level. Therefore, the field of the digital nameplate that contains or represents the software license information can be remotely updatable in the field by a user.

Figure 10:
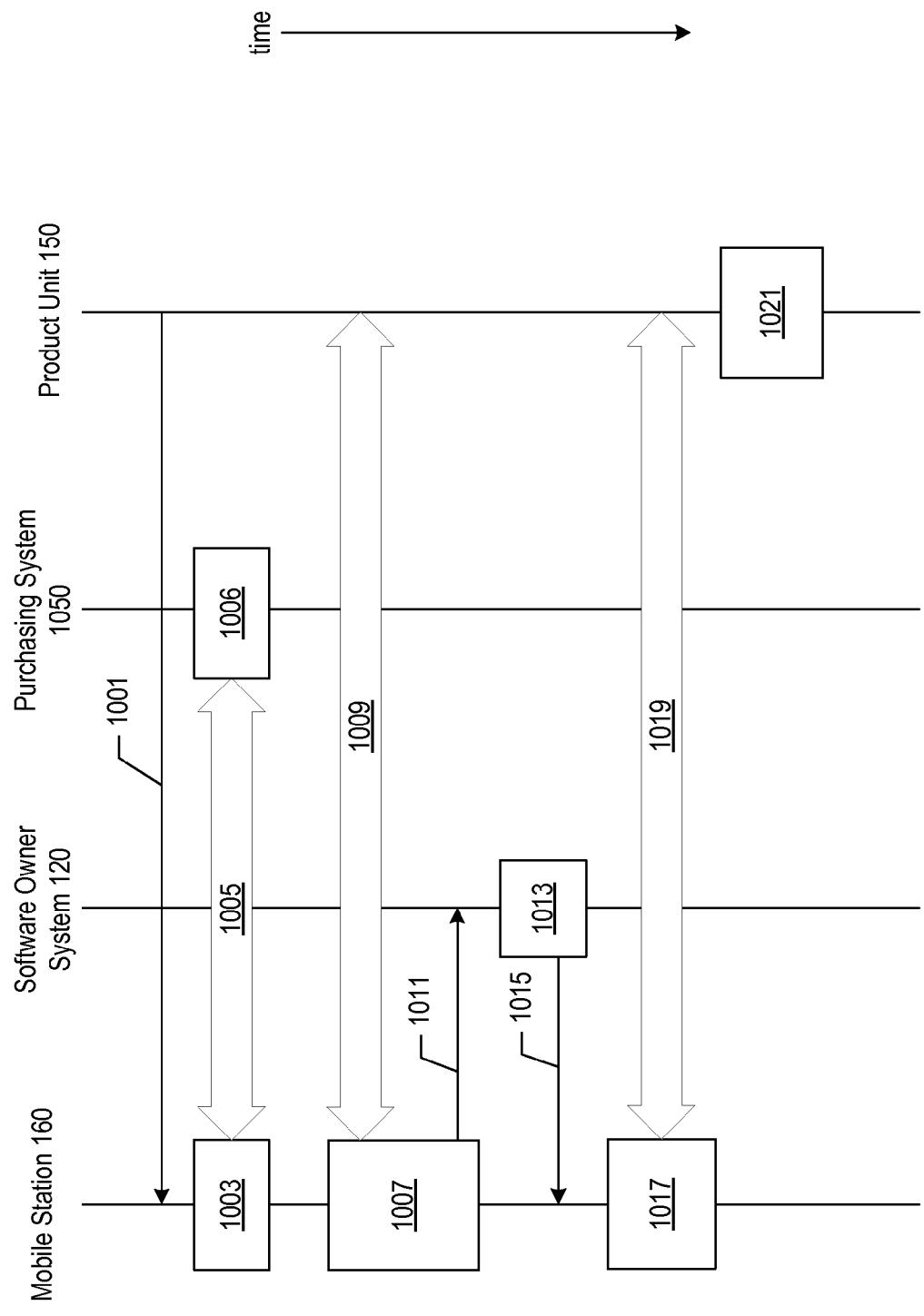
FIG. 10 depicts some salient operations of method 1000 according to an illustrative embodiment of the present invention, in which one or more licensed products are updated in the field by a user.

FIG. 10 depicts some salient operations of method 1000 according to an illustrative embodiment of the present invention, in which one or more licensed products are updated in the field by the user. As depicted in FIG. 10, the user of the software app being executed by mobile station 160 learns that his product unit has limited functionality because at least one software module in the unit is not yet licensed. The software app is notified of the limited functionality via message 1001 from product unit 150 and presents the information to the user. In some alternative embodiments of the present invention, another mechanism can be used to notify the user about the limited functionality.

The user decides to make an in-app purchase of the software owner's license. Correspondingly and in accordance with operation 1003, mobile station 160 processes, in well-known fashion, a sequence of transactions 1005 with purchasing system 1050, which handles the transactions in accordance with operation 1006. For example and without limitation, system 1050 can correspond to Google Checkout™, PayPal™, station 160's wireless carrier's billing service, and so on.

Mobile station 160 then initiates in accordance with operation 1007 a sequence of transactions 1009 with product unit 150. The sequence of transactions is analogous to the sequence depicted in FIG. 6 (for operation 503) except that "Server Computer 111" and "Test Rig 112", as part of "Manufacturer System 110" as depicted in FIG. 6, can be interpreted in the present context as corresponding to mobile station 160. As part of transaction sequence 1009, product unit 150 has a license tag programmed in a non-volatile memory as part of an updating process. Mobile station 160 initiates the updating process and, in doing so, performs the following actions:

i. reads, or otherwise receives, a data set or equivalent from product unit 150, including its media access control (MAC) address, for example and without limitation.

ii. establishes a secure connection to software owner system 120's web-based, licensing service, via message 1011. As those who are skilled in the art will appreciate, this can be accomplished through one or more remote API (application programming interface) calls by using well-known, secure methods (e.g., web services, RPC, SOAP, etc.). The licensing service provides traceability and accountability for licenses issued.

iii. provided that payment has been authorized by purchasing system 1050, receives a software license tag from the licensing service via message 1015. Using software owner system 120's private key, the software license tag is determined mathematically in accordance with operation 1013 as a digital signature of the MAC address of the data set and, optionally, of other information. Operation 1013 is analogous to operation 509, which is depicted in FIG. 7. In some embodiments, a product unit identifier different than the MAC address is signed, while in some other embodiments a different datum entirely is signed. For example and without limitation, if product unit 150 had previously been provided with a license at a particular level, mobile station 160 receives a new signature for a new set of nameplate data (e.g., with only an update of a field that indicates the license level, with updates to another field or fields, with new fields, etc.).

iv. calls product unit 150's application programming interface (API) over network 170 to update the license-level field and/or possibly other fields, and to upload a new digital signature validating the new nameplate. Mobile 160 updates the one or more fields, in accordance with operation 1017 and through a sequence of transactions 1019. Operation 1017 is analogous to operation 513, which is depicted in FIG. 8.

Optionally, product unit 150's firmware validates the digital signature before storing it in its memory, in accordance with operation 1021.

Notably, the signature can cover the information that is updated in the field by the user, such as the license level of the purchased license. The signature can cover other information such as the owner's name, email address, and so on. The software app can allow the owner to provide such information, whereupon the software-licensing server verifies it and signs the updated nameplate.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for controlling a device, the method comprising:

transmitting, by a first wireless device, a first message comprising a first identifier, wherein the first message requests a first digitally-signed document from a second wireless device, wherein the second wireless device is identified by the first identifier;

receiving, by the first wireless device, a second message from the second wireless device, in response to the transmitting of the first message, wherein the second message comprises the first digitally-signed document, wherein first digitally-signed document comprises a first digital signature;

verifying that the first digital signature received from the second wireless device is valid, based on a first public key;

presenting to a user, by the first wireless device, a first indicium that represents the second wireless device, only if the first digital signature is verified as being valid;

transmitting, by the first wireless device, a request for a second digitally-signed document from the second wireless device;

receiving, by the first wireless device and in response to the transmitting of the request, the second digitally-signed document, wherein second digitally-signed document comprises a second digital signature;

verifying that the second digital signature received from the second wireless device is valid, based on a second public key; and presenting to the user, by the first wireless device, a second indicium only if the second digital signature is verified as being valid.

2. The method of claim 1 wherein the first digital signature has been determined mathematically by using the first identifier.

3. The method of claim 1 wherein the first identifier comprises a globally unique communications address of the second wireless device, and wherein the first digital signature of the first digitally-signed document reflects the globally unique communications address.

4. The method of claim 3 wherein the globally unique communications address of the second wireless device is a media access control (MAC) address.

5. The method of claim 1 wherein the second digital signature has been determined mathematically by using an identifier of a brand.

6. The method of claim 5 wherein the second indicium represents the brand.

7. A first wireless device for controlling another device, comprising:
- a transmitter configured to i) transmit a first message comprising a first identifier, wherein the first message requests a first digitally-signed document from a second wireless device, wherein the second wireless device is identified by the first identifier, and to ii) transmit a request for a second digitally-signed document from the second wireless device;
- a receiver configured to i) receive a second message from the second wireless device, in response to the transmitting of the first message, wherein the second message comprises the first digitally-signed document, wherein the first digitally-signed document comprises a first digital signature, and to ii) receive, in response to the transmitting of the request, the second digitally-signed document, wherein the second digitally-signed document comprises a second digital signature;
- a processor configured to i) verify that the first digital signature received from the second wireless device is valid, based on a first public key, and to ii) verify that the second digital signature received from the second wireless device is valid, based on a second public key; and
- a display configured to i) present a first indicium that represents the second wireless device, only if the first digital signature is verified as being valid, and to ii) present a second indicium only if the second digital signature is verified as being valid.

8. The first wireless device of claim 7 wherein the first identifier comprises a globally unique communications address of the second wireless device, and wherein the first digital signature of the first digitally-signed document reflects the globally unique communications address.

9. The first wireless device of claim 8 wherein the globally unique communications address of the second wireless device is a media access control (MAC) address.

10. The first wireless device of claim 7 wherein the second digital signature has been determined mathematically by using an identifier of a brand.

11. The first wireless device of claim 10 wherein the second indicium represents the brand.

12. A method for monitoring a device, comprising:
- receiving, by a server computer, i) first message comprising a) a first identifier that identifies a first wireless device and b) a first datum, and ii) a second message comprising a) a second identifier that identifies a second wireless device and b) a second datum;
- comparing, by the server computer, the first datum and the second datum, based on the first identifier and the second identifier matching each other;
- inferring, by the server computer, a characteristic of the manufacture of the first wireless device, based on the comparing; and
- transmitting, by the server computer, a third message based on the inferred characteristic;
- wherein the first datum correlates to a time that an event involving the first wireless device occurs, and wherein the second datum correlates to a time that an event involving the second wireless device occurs.

13. The method of claim 12 wherein the first datum correlates to the geolocation of the first wireless device, and wherein the second datum correlates to the geolocations of the second wireless device.

14. The method of claim 13 wherein the inferring is based on the geolocations of the first and second wireless devices both being within a predetermined region.

15. The method of claim 13 wherein the inferring is based on the geolocations of the first and second wireless devices being within a predetermined distance of each other.

16. The method of claim 12 wherein the inferring is based on the time that the event involving the first wireless device occurs and the time that the event involving the second wireless device occurs both being within a predetermined period of time.

17. The method of claim 12 wherein the inferring is based on the time that the event involving the first wireless device occurs and the time that the event involving the second wireless device occurs being within a predetermined interval of each other.

18. The method of claim 12 wherein the inferred characteristic is the date of manufacture of the first wireless device.

19. The method of claim 12 wherein the inferred characteristic is the identity of the manufacturer of the first wireless device.

* * * * *